Figure 2:
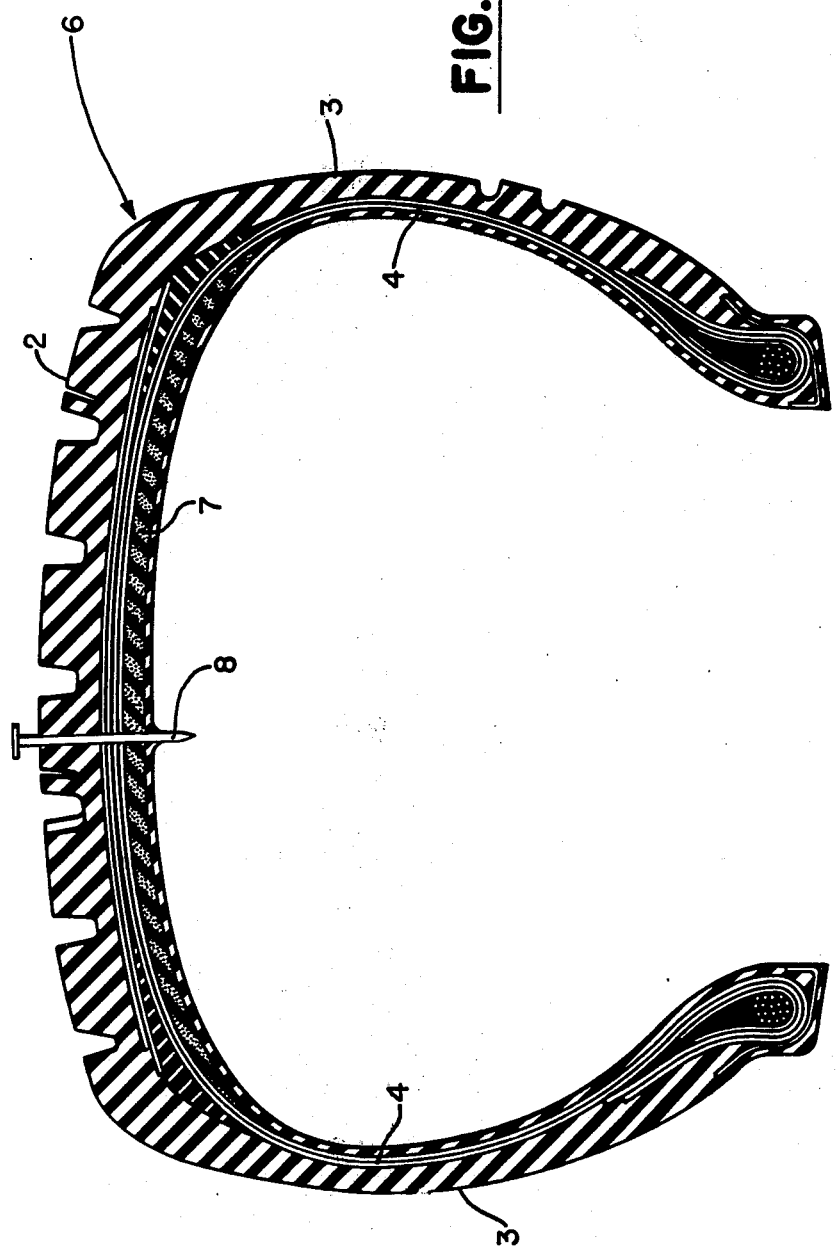

United States Patent [19]
Dobson

[11] 4,163,467
[45] Aug. 7, 1979

[54] SELF-SEALING PNEUMATIC TIRE

[75] Inventor: Robert L. Dobson, Tallmadge, Ohio

[73] Assignee: The Goodyear Tire & Rubber Company, Akron, Ohio

[21] Appl. No.: 368,145

[22] Filed: Jun. 8, 1973

[51] Int. Cl.² .............................................. B60C 19/12
[52] U.S. Cl. ...................................... 152/347; 106/33
[58] Field of Search ................ 152/346, 347, 310–312; 106/33; 156/115

[56] References Cited
U.S. PATENT DOCUMENTS

| | | | |
|---|---|---|---|
| 2,765,018 | 10/1956 | Connell | 152/347 |
| 2,827,098 | 3/1958 | Semegen et al. | 152/347 |
| 2,877,819 | 3/1959 | Gibbs | 152/347 |

Primary Examiner—Joseph F. Peters, Jr.
Assistant Examiner—D. W. Underwood
Attorney, Agent, or Firm—H. C. Young, Jr.

[57] ABSTRACT

A self-sealing pneumatic tire which comprises a tire casing having an integral, thin gauge, resilient closed cell structure disposed in its inward portion. Such a tire structure has particular utility for sealing against puncturing objects.

17 Claims, 4 Drawing Figures

SELF-SEALING PNEUMATIC TIRE

This invention relates to a self-sealing pneumatic tire. This invention more specifically relates to a puncture-sealing pneumatic tire having an air barrier of an inner integral, covulcanized, thin gauge resilient closed cell structure.

For safety, a pneumatic tire has historically been sought which has a means of retarding or preventing its deflation upon being punctured. Many methods and tire constructions have been suggested and used for this purpose without significant commercial success for ordinary passenger vehicles such as automobiles which are to be driven over typical roadways. Fluid puncture sealants which seal by flowing into the puncture hole have been unsuccessful because they tend to cause the tire to become out of balance. Central cores of cellular material which will physically maintain the tire shape when punctured generally place a restriction on the vehicular maximum speed.

It is, therefore, an object of this invention to provide a self-sealing pneumatic tire which has an ability to seal against puncturing objects.

In accordance with this invention, a seal-sealing pneumatic tire has been discovered which comprises a tire casing having an integral, thin gauge, resilient closed cell structure disposed in its inward portion.

Thus, in further accordance with this invention a puncture-sealing pneumatic tire is provided having two spaced inextensible beads, a ground contacting tread portion, a pair of individual sidewalls extending radially inward from the axial outer edges of said tread portion to join the respective beads, a supporting structure for said tread portion and sidewalls usually extending from bead to bead and an air barrier of an integral, thin gauge, covulcanized, resilient rubber closed cell structure disposed inwardly of said supporting structure.

The invention relies upon the discovery that the cooperative combination of the critical requirements of the integral, thin gauge, covulcanized, resilient closed cell structure, particularly where said cells have a greater than atmospheric internal pressure, enable said closed cell structure to be actuated by a puncturing object to seal the resulting leak of air from said tire to the atmosphere. Therefore, the resilient closed cell structure is required to be an integral dynamic part of the tire. The invention is uniquely operable as a pneumatic tire construction for typical vehicular speeds, such as at least up to about 70 and typically up to at least 100 miles per hour. Pneumatic tires can be prepared with such an internal cell structure for vehicular speeds in excess of 200 miles per hour.

The integral thin gauge closed cell structure can be disposed in various inner portions of the tire where it is desired to guard against punctures. For example it can typically extend from bead to bead for protection of both the tread and sidewall portions of the tire or it can simply be selectively and locally disposed only inwardly of the tread portion for protection against punctures occurring through the tread.

The cell structure is required to be covulcanized with the tire in order to be integral with the dynamic tire construction. It is built as a solid unvulcanized layer containing a heat activatable blowing agent onto the inner portion of the green, unvulcanized tire over a building form and then shaped, molded and heated under pressure to simultaneously covulcanize therewith. The pressure is generally supplied by a shaping bladder positioned within the tire to press and shape it outwardly against a mold. The closed cell structure is formed by heat activating said blowing agent during the vulcanization process to simultaneously expand said adherent solid layer. Typical vulcanization temperatures range from about 90° C. to about 200° C. Thus, it is required that the cell structure is formed substantially simultaneously with the covulcanization step in order to enhance the integral tire construction. The cell structure itself is therefore integral with the tire construction, instead of being a simple laminate.

An important feature of the preparation of the tire of this invention is the substantial departure from typical tire building methods. Generally it has heretofore been desired to eliminate air between a shaping bladder and tire in the heating, shaping, molding and vulcanization step. Excessive trapped air within the tire casing has caused the tire to prematurely fail. However, in the practice of this invention, the manipulation of the preparation steps require that a blowing agent be activated within a solid rubbery layer of the tire during its heating, shaping and vulcanization step. The confined cellular structure remains in a compressed state until the vulcanization step is essentially complete. Surprisingly a cell structure results which not only self seals against punctures, but which also successfully becomes a dynamic part of the tire.

The integral cell structure of the tire is required to be thin gauge without occupying any substantial inner portion of the inflated tire. Generally, its thickness ranges from about 1 to about 80 and preferably about 10 to about 50 percent of the total tire thickness, depending somewhat upon the tire size and intended use of the tire with its structured volume being less than about 25 percent, preferably less than about 10 percent, of the encompassed volume of air in the pneumatic tire. Thus, a typical thickness is in the range of about 10 to about 30 percent of the total tire thickness for an ordinary passenger pneumatic tire with its volume being less than about 10 percent of the encompassed volume of air in the pneumatic tire.

The narrow gauge cell structure is required to be resilient in order to effectively seal against a puncturing object or to close a puncture. The resilient closed cell structure seals by compressing against puncturing objects and by expanding to fill a puncture. Its resiliency is generally somewhat dependent upon the modulus or hardness of its elastomeric composition, internal cell pressure and cell size. The resiliency can be characterized by having a compressability in the range of about 1 to about 800 pounds per square inch (psi) and preferably about 1 to about 100 psi at 50 percent compression at 25° C.

The cell structure typically has an unloaded specific gravity equal to about 0.60 to about 1.40, preferably about 0.80 to about 1.16. The term unloaded specific gravity relates to the structural material, such as rubber, without being loaded with pigments and fillers such as carbon black, silica, zinc oxide and oils.

The amount of internal cell pressure desired is dependent upon the degree of self-sealing ability desired in combination with the resiliency of the cell structure. It should be readily appreciated by those having skill in the tire art that the actual internal cell pressure is typically in a constant state of transition. Because of the natural ability of the gases such as air and nitrogen as well as others to diffuse through rubber and other typical tire building polymers, the internal cell pressure tends to seek the actual tire inflation pressure. Tire inflation pressure can vary somewhat over a period of time and can vary with temperature change. It is well recognized that pneumatic tires can have a wide range of inflation pressures such as from about 5 psig to about 300 psig, depending somewhat upon their construction and intended use. For example, a passenger car tire can have an intended inflation pressure in the range of about 22 to 32 psig. Therefore, although it is important that the cells have an internal pressure greater than atmospheric such as at least about 3 psig, an actual desired internal cell pressure is dependent upon the degree of self-sealing ability desired and the tire inflation pressure.

The tire of this invention can self-seal against various puncturing objects depending somewhat upon the resiliency, thickness and internal pressure of the closed cell structure. Typically the tire can self seal punctures caused by nails and objects of various sizes. Representative of such nails are No. 4 to 6 and even up to 10 large headed nails such as box and shingle nails having diameters in the range of about 0.6 to about 0.13 inches, respectively.

The vulcanized rubber tire and the covulcanized integral closed cell inner structure can be of various cured or vulcanized rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulfur cured or vulcanized natural rubber and synthetic rubbery polymers are preferred such as butadiene-styrene rubber, cis-1,4-polyisoprene, polybutadiene, butyl rubber and chlorobutyl rubber.

The blowing agents used in the practice of this invention for the manufacture of the pneumatic tire are those which liberate gases upon heating. Representative examples of such agents are those which liberate gases such as nitrogen, carbon dioxide, ammonium bicarbonate and sodium bicarbonate and cause the formation of the integral closed cell internal layer. Usually agents which liberate nitrogen are preferred. Such blowing agents are compounds which give off gases upon being triggered by the vulcanization temperatures, representative of which are nitro, sulfonyl and azo compounds such as dinitrosopentamethylene tetramine, N,N'-dimethyl-N,N'-dinitrosophthalamide, azodicarbonamide, sulfonyl hydrazides such as benzenesulfonyl hydrazide, toluenesulfonyl hydrazide and p,p'-oxy-bis-(benzenesulfonyl)hydrazide and sulfonyl semicarbazides such as p-toluene sulfonyl semicarbazide and p,p'-oxy-bis-(benzenesulfonyl semicarbazide).

Figure 1:
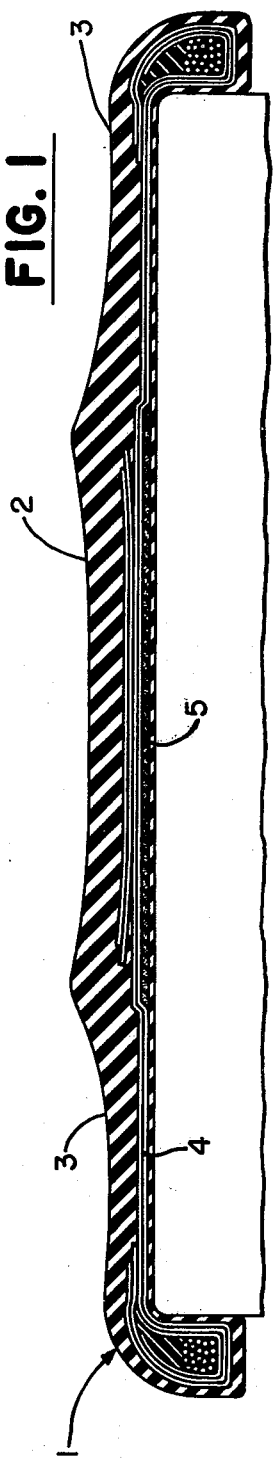
Figure 4:
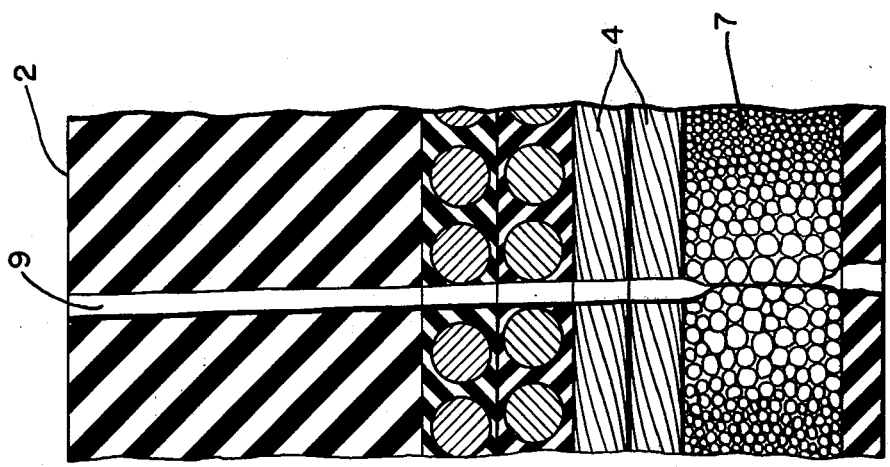
Figure 3:
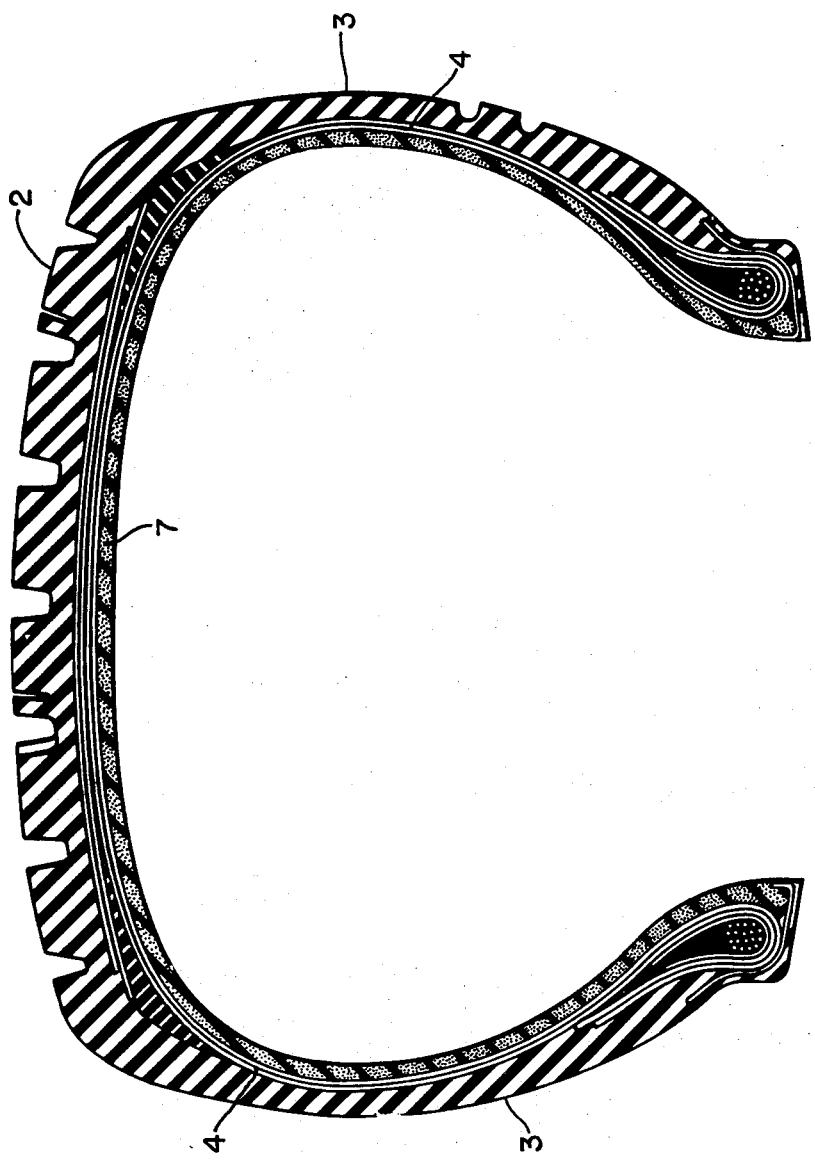

The invention will be more readily understood with respect to the accompanying drawings wherein:

FIG. 1 is a cross-sectional view of a cylindrically shaped, green, unvulcanized tire construction containing elements which are to become its tread, sidewall and bead portions as well as a supporting member for said tread and sidewall and as well as a solid layer adhered to the inner side of said supporting member containing a heat activatable blowing agent;

FIG. 2 is a cross-sectional view of a shaped, molded and cured pneumatic tire having an integral, thin gauge, covulcanized, resilient rubber closed cell structure on its inner surface and with a covulcanized protective covering; and FIG. 3 is a cross-sectional view of a pneumatic tire similar to FIG. 2 with said closed cell structure extending from bead to bead without a protective covering; and FIG. 4 is an enlarged cross-sectional view of the tire of FIG. 2 at its tread portion illustrating the effective closure or sealing of the puncture by said closed cell construction.

More specifically, in the drawings it is shown that a pneumatic rubber tire can be prepared by building an unshaped and unvulcanized basic tire 1 containing what are to become the customary tread portion 2, sidewalls 3 and support member 4, which typically contains plies to back and reinforce the tread and sidewall portions, and particularly a solid inner rubber layer 5 which contains a heat activatable blowing agent. The unshaped tire is then placed in a mold where it is shaped, molded and heated under pressure to simultaneously covulcanize the tire and inner layer and also activate said blowing agent to form a pneumatic tire 6 containing the integral, thin gauge, covulcanized, resilient rubber closed cell foam structure 7 on its inner surface.

With further reference to the figures, particularly FIG. 2, the practice of this invention is more clearly depicted by showing the actual puncturing of the pneumatic tire 6 with a nail 8 and the automatic sealing of the tire by the resilient cell structure as its cell walls compress against the nail. The nail is then removed, as seen in FIG. 4, to leave the hole 9 in the tire extending through the closed cell structure 7. The internal pressure of the resilient cell structure causes the cell walls to expand and seal the hole. If the hole is not fully sealed, deflation of the tire, with its accompanying reduction of air pressure and increase of pressure differential across the cell walls actuates further cell wall expansion and effects the sealing of the puncture.

It should be understood that the self-sealing pneumatic tire of this invention, although it is depicted in FIG. 3 of the drawings as containing an integral closed cell structure on its inner surface opposite the tread portion, it can also be covered over its exposed surface with a protective integral innerliner as shown in FIG. 2.

The practice of this invention is further illustrated by reference to the following examples which are intended to be representative rather than restrictive of the scope of the invention. Unless otherwise indicated, all parts and percentages are by weight.

EXAMPLE I

An unshaped and unvulcanized tire was built around a drum having a diameter of about 15 inches by first building over the drum an inner layer of rubber having generally the following composition as shown in Table 1, having a thickness of about 0.23 inch.

Table 1

| Compound | Amount[1] |
| --- | --- |
| Chlorobutyl Rubber | 100 |
| Carbon Black | 50 |
| Plasticizer | 20 |
| Curative[2] | 4 |

Table 1-continued

| Compound | Amount[1] |
|---|---|
| Blowing Agent[3] | 2 |

[1]parts by weight
[2]sulfur plus accelerator
[3]N-Nitroso compound, heat activatable Over this initial layer of rubber the remainder of the tire was built including the layup of the rubberized fabric plies, tread, sidewall and bead portions as generally shown in FIG. 1 of the drawings. The fabricated tire was then removed from the building form and shaped, molded and vulcanized in the tire press at a minimum temperature of about 92° C. to form a tire size JR 78-15. The inner layer of especially compounded rubber expanded as the blowing agent was heat activated during the vulcanization process to form an integral closed cell structure having a density of about 45 pounds per cubic foot, a thickness of about 0.09 inches and a compressability of about 28 pounds per square inch (psi) at a 50 percent compression. The reduction in thickness of the integral closed cell structure is primarily due to the thinning out of its formative layer during the shaping step.

The tire was then tested by inflating and driving a 0.1 inch diameter No. 6 box nail through its tread portion following which the nail was removed and a determination was made that the air leakage was effectively stopped as shown in Tables 2 and 3. A control tire was also prepared according to the method of this example, except that no closed cell structure was built into the tire, and punctured with the No. 6 nail.

Table 2

| | Static Pressure Loss | |
|---|---|---|
| | Experimental Tire | Control Tire |
| Initial tire inflation (psig) | 19 | 23 |
| Inflation maintained after 5 hours (psig) | 19 | |
| Inflation maintained after 7 hours (psig) | | 6.5 |

Table 3

| Dynamic Pressure Loss | |
|---|---|
| Initial tire inflation (psig) | 32 |
| Pressure after running the tire at 8 miles per hour (mph) with a 1580 pound load: | |
| 1 hour | 36 |
| 5 hours | 35 |
| 11 hours | 34 |
| Test stopped after 11 hours and tire allowed to cool somewhat to about 24° C. | |
| Pressure at 24° C. after about 24 hours from initial puncture and dynamic test (psig) | 20 |

EXAMPLE II

Vulcanized tires containing a covulcanized integral inner closed cell construction were prepared according to Example I and submitted to DOT (Department of Transportation) High Speed and Endurance Tests MVSS 109. The High Speed Test was conducted by placing the inflated tire (30 psig) under a load of 1580 pounds and running at progressively increased speeds of 50 to 100 miles per hour over a period of 7 hours. The Endurance Test was conducted by running the tire at 50 miles per hour under progressively increasing loads of 1580 to 2100 pounds over a period of 42 hours. The tires were then dismounted and examined. Evidence of fatigue or failure would render the tire a failure. The tires passed both the High Speed and Endurance Tests thereby showing that the closed cell structure in the construction of the tires did not inhibit their acceptance for relatively high speed and high load use. Thus, the integral closed cell structure was effectively a dynamic part of the tire.

EXAMPLE III

Four tires of type JR 78-15 were prepared according to the method of Example I except that one of the tires was built as a control with no integral closed cell structure on its interior portion and three of the tires were built with various gauges of the integral closed cell structure air barrier ranging from 0.09 to about 0.5 inch thickness comprised of a sulfur cured synthetic rubber. The tires were mounted on a 1971 Cadillac automobile and each tire was punctured through its tread portion with both a No. 6 and No. 10 nail. Such nails generally have a diameter of about 0.06 and about 0.1 inch, respectively. The nails were removed from the tires and the automobile was driven through normal highway and traffic conditions thereby experiencing various starting and stopping maneuvers as well as many and various driving speeds. Pressure in the tires was tested periodically. The automobile was allowed to stand overnight and the tires were then retested for pressure loss, the control being already flat from driving during the day. Results of the test are more clearly shown in Table 4 which compares the control tire with the tires having the 0.25 inch integral closed cell air barrier structure having a high and a low starting inflation pressure.

Table 4

| | Cadillac Road Test | | |
|---|---|---|---|
| | Control Tire | Air Barrier Tire | |
| Original psig | 34 | 29 | 18 |
| Dynamic loss (gain) after: | | | |
| ½ hour | −9 | +5 | |
| 1 hour | −14 | +6 | +5 |
| 4 hours | −34 | +6 | +5 |
| Static loss after: | | | |
| 18 hours | already flat | −3 | −2 |
| 65 hours | already flat | | −5 |

Therefore, it is easily seen that the tire of the applicants' invention is a very substantial improvement over a tire with no integral closed cell air barrier structure. The air barrier tire after 4 hours of driving had an increase of inflation pressure of about 6 pounds reflecting the increase in running temperature of the tire whereas the control lost 34 pounds indicating a flat tire. Also as shown in the Static Tire Test, the air barrier tire lost only about 3 pounds upon further standing for an additional 18 hours.

Additional testing of similar tires in the laboratory confirmed the Automobile Road Test as more clearly shown in Table 5.

Table 5

|  | Control Tire | Air Barrier Tire |
|---|---|---|
| Static Test | | |
| Original psig | 31.5 | 30 |
| Loss after: | | |
| ¼ hour | −3.5 | 0 |
| 1 hour | −8.5 | 0 |
| 4 hours | −21.5 | −1 |
| Dynamic Laboratory Test | | |
| Original psig | 18 | 18 |
| Loss after: | | |
| ¼ hour | −4 | 0 |
| ½ hour | −9 | 0 |
| 1 hour | −18 (flat) | 0 |
| 24 hours | −18 (flat) | −4 |

In Table 5 it is shown that the control tire went flat after about 24 hours whereas the air barrier tire lost only 9 pounds. Furthermore under the Dynamic Laboratory Test the control went flat after about 1 hour whereas the air barrier tire lost only about 4 pounds over a 24-hour period.

While certain representative embodiments and details have been shown for the purpose of illustrating the invention, it will be apparent to those skilled in this art that various changes and modifications may be made therein without departing from the spirit or scope of the invention.

I claim:

1. A self-sealing pneumatic tire which comprises two spaced inextensible beads, a ground contacting tread portion, a pair of individual sidewalls extending radially inward from the axial outer edges of said tread portion to join the respective beads, a supporting structure for said tread portion and sidewalls and an integral, thin gauge, covulcanized, resilient rubber closed cell structure disposed inwardly of said supporting structure, where the internal pressure of said closed cells is greater than atmospheric pressure.

2. The self-sealing pneumatic tire of claim 1 where said closed cell structure is disposed inwardly of said tread and sidewalls and extends from bead to bead.

3. The self-sealing pneumatic tire of claim 1 where said closed cell structure is locally disposed inwardly of said tread portion.

4. The self-sealing pneumatic tire of claim 1 where said tread, sidewalls, reinforcing structure and closed cell structure are comprised of a vulcanized polymeric material selected from natural rubber and synthetic rubber, where said closed cell structure is characterized by having a thickness in the range of about 1 to about 80 percent of the total tire thickness, a structural volume of less than about 25 percent of the encompassed volume of air of the tire, a compressability in the range of about 1 to about 800 psi at 50 percent compression at 25° C. and an internal closed cell pressure of at least about 3 psig.

5. The self-sealing pneumatic tire of claim 4 having an air inflation pressure in the range of about 22 to about 32 psig, where said closed cell structure is characterized by having a thickness in the range of about 10 to about 50 percent of the total tire thickness, a structural volume of less than about 10 percent of the encompassed volume of air of the tire and a compressability in the range of about 1 to about 100 psi at 50 percent compression at 25° C.

6. The self-sealing pneumatic tire of claim 4 where said integral closed cell structure has an integral covulcanized rubber protective covering.

7. The self-sealing pneumatic tire of claim 4 where said synthetic rubber is selected from at least one of butadiene-styrene rubber, cis-1,4-polyisoprene, polybutadiene, butyl rubber and chlorobutyl rubber.

8. The self-sealing pneumatic tire of claim 4 where said closed cell structure contains a gas composed primarily of a gas selected from the group consisting of nitrogen, carbon dioxide, ammonium bicarbonate and sodium bicarbonate.

9. The self-sealing pneumatic tire of claim 4 where said gas is primarily composed of nitrogen and where said closed cell structure is characterized by having a thickness in the range of about 10 to about 50 percent of the total tire thickness, a structural volume of less than about 10 percent of the encompassed volume of air of the tire and a compressability in the range of 1 to about 100 psi at 50 percent compression at 25° C.

10. The self-sealing tire of claim 4 where the said closed cell structure contains a gas composed primiarly of nitrogen and is disposed locally as the inner surface of the tire inward from its tread portion.

11. The self sealing tire of claim 4 where said closed cell structure contains a gas composed primarily of nitrogen and is disposed as the inner surface of the tire inward of both its tread and sidewall portions.

12. The self-sealing pneumatic tire of claim 1 where said closed cell structure contains a gas composed primarily of a gas selected from the group consisting of nitrogen, carbon dioxide, ammonium bicarbonate and sodium bicarbonate.

13. The self-sealing pneumatic tire of claim 1 where said gas is primarily composed of nitrogen and where said closed cell structure is characterized by having a thickness in the range of about 10 to about 50 percent of the total tire thickness, a structural volume of less than about 10 percent of the encompassed volume of air of the tire and a compressability in the range of 1 to about 100 psi at 50 percent compression at 25° C.

14. The self-sealing tire of claim 1 where the said closed cell structure contains a gas composed primarily of nitrogen and is disposed locally as the inner surface of the tire inward from its tread portion.

15. The self-sealing tire of claim 1 said closed cell structure contains a gas composed primarily of nitrogen and is disposed as the inner surface of the tire inward of both its tread and sidewall portions.

16. The self-sealing tire of claim 7 where the said closed cell structure contains a gas composed primarily of nitrogen and is disposed locally as the inner surface of the tire inward from its tread portion.

17. The self-sealing tire of claim 7 where said closed cell structure contains a gas composed primarily of nitrogen and is disposed as the inner surface of the tire inward of both its tread and sidewall portions.

* * * * *